US011606589B2

(12) United States Patent
Gurfinkel et al.

(10) Patent No.: US 11,606,589 B2
(45) Date of Patent: *Mar. 14, 2023

(54) DYNAMIC DELAY EQUALIZATION FOR MEDIA TRANSPORT

(71) Applicant: Biamp Systems, LLC, Beaverton, OR (US)

(72) Inventors: Eugene Gurfinkel, Portland, OR (US); Michael K. Davis, Beaverton, OR (US); Charles H. Van Dusen, Wilsonville, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,678

(22) Filed: May 24, 2022

(65) Prior Publication Data

US 2022/0286723 A1 Sep. 8, 2022

Related U.S. Application Data

(63) Continuation of application No. 17/009,705, filed on Sep. 1, 2020, now Pat. No. 11,343,552, which is a
(Continued)

(51) Int. Cl.
*H04N 21/242* (2011.01)
*H04L 47/22* (2022.01)
(Continued)

(52) U.S. Cl.
CPC ......... *H04N 21/242* (2013.01); *H04J 3/0682* (2013.01); *H04L 47/22* (2013.01);
(Continued)

(58) Field of Classification Search
CPC ............. H04N 21/242; H04N 21/2402; H04N 21/4307; H04N 5/2176; H04N 5/211
(Continued)

(56) References Cited

U.S. PATENT DOCUMENTS 8,922,713 B1 12/2014 Chakrovorthy et al.
2003/0156601 A1 8/2003 Planka
(Continued)

FOREIGN PATENT DOCUMENTS

WO 2012148938 A1 11/2012
WO 2014190642 A1 12/2014

OTHER PUBLICATIONS

Anonymous, Advanced Television Systems Committee, "ATSC Implementation Subcommittee Finding: Relative Timing of Sound and Vision for Broadcast Operations", Jun. 26, 2003.

*Primary Examiner* — Sherrie Hsia

(57) ABSTRACT

Systems and methods of the present disclosure provide for dynamic delay equalization of related media signals in a media transport system. Methods include receiving a plurality of related media signals, transporting the related media signals along different media paths, calculating uncorrected propagation delays for the media paths, and delaying each of the related media signals by an amount related to the difference between the longest propagation delay (of the uncorrected propagation delays) and the uncorrected propagation delay of the related media signal/media path. Calculating the uncorrected propagation delays and delaying the related media signals may be performed in response to a change to the propagation delay of at least one of the related media signals/media paths. Additionally or alternatively, calculating the uncorrected propagation delays and delaying the related media signals may be performed while transporting the related media signals.

20 Claims, 4 Drawing Sheets

Related U.S. Application Data continuation of application No. 16/543,562, filed on Aug. 18, 2019, now Pat. No. 10,764,620, which is a continuation of application No. 16/174,930, filed on Oct. 30, 2018, now Pat. No. 10,390,061, which is a continuation of application No. 15/866,346, filed on Jan. 9, 2018, now Pat. No. 10,116,977, which is a continuation of application No. 15/610,158, filed on May 31, 2017, now Pat. No. 9,866,883.

(60) Provisional application No. 62/344,614, filed on Jun. 2, 2016.

(51) Int. Cl.
    *H04J 3/06*     (2006.01)
    *H04N 7/54*     (2006.01)
    *H04N 21/43*     (2011.01)
    *H04N 21/24*     (2011.01)
    *H04N 21/6437*     (2011.01)
    *H04N 21/2368*     (2011.01)

(52) U.S. Cl.
CPC ........... *H04N 7/54* (2013.01); *H04N 21/2402* (2013.01); *H04N 21/4307* (2013.01); *H04N 21/43072* (2020.08); *H04N 21/2368* (2013.01); *H04N 21/6437* (2013.01)

(58) Field of Classification Search
USPC ........ 348/515, 512, 613, 614, 914; 375/229, 375/230, 232–234, 264, 286, 293
See application file for complete search history.

(56) References Cited

U.S. PATENT DOCUMENTS

| | | |
|---|---|---|
| 2006/0244865 A1 | 11/2006 | Simon |
| 2007/0110107 A1 | 5/2007 | Tighe et al. |
| 2008/0259966 A1 | 10/2008 | Baird et al. |
| 2009/0063890 A1 | 3/2009 | Ware |
| 2009/0282452 A1 | 11/2009 | Wei |
| 2010/0183316 A1 | 7/2010 | Gordon et al. |
| 2010/0190509 A1 | 7/2010 | Davis |
| 2010/0235486 A1 | 9/2010 | White et al. |
| 2011/0231883 A1 | 9/2011 | Maynard et al. |
| 2011/0286472 A1 | 11/2011 | Williams et al. |
| 2012/0243593 A1 | 9/2012 | Nakanishi et al. |
| 2012/0327300 A1 | 12/2012 | Hutchings et al. |
| 2015/0358376 A1 | 12/2015 | Fan et al. |

DYNAMIC DELAY EQUALIZATION FOR MEDIA TRANSPORT

FIELD OF THE INVENTION

The present disclosure relates to dynamic delay equalization for media transport.

BACKGROUND OF THE INVENTION

When related audio and video content are rendered together (to be observed at the same time), the audio and video signals need to be time aligned or the observer will recognize a lip sync error. This error is named lip sync because observers are keenly aware of it when the sight of a person's lips does not match timing of the accompanying sound of the person's voice. Lip sync error is due to audio and video signals being presented with different amounts of delay. The error is corrected by delaying the earlier signal (almost always the audio signal).

Lip sync error is a concern because video processing generally induces delays that are significantly longer than audio processing delays. Some studies indicate observers will notice lip sync errors where the audio leads (is more advanced than) the video by more than 45 ms (milliseconds) and where the audio lags (trails) the video by more than 125 ms. The recommendation of the ATSC (Advanced Television Systems Committee) Implementation Subcommittee IS-191 is to align related audio and video signals within the range of −15 ms (audio leads) to 45 ms (audio lags).

Further, audio signals that are rendered together may produce a noticeable delay or echo if not sufficiently time aligned. A human observer will hear two sounds separated by a sufficiently short delay as a single, fused auditory image (the Haas effect). The maximum delay (called the echo threshold) varies according to the type of sound and circumstances, and may range from about 5-40 ms. Hence, audio signals that are rendered together may need a relative delay of less than about 40 ms to achieve auditory fusion. Even below the threshold for audio fusion, comb filtering effects may be heard if the same audio signal is rendered by separate transducers that produce a relative delay of a few milliseconds or less.

SUMMARY OF THE INVENTION

Systems and methods of the present disclosure provide for dynamic delay equalization of related media signals in a media transport system. Methods include receiving a plurality of related media signals, transporting the related media signals along different media paths, calculating uncorrected propagation delays for the media paths, and delaying each of the related media signals by an amount related to the difference between the longest propagation delay (of the uncorrected propagation delays) and the uncorrected propagation delay of the related media signal/media path. The related media signals are each sourced from a shared source space and are destined to a shared observation space. Calculating the uncorrected propagation delays and delaying the related media signals may be performed in response to a change to the propagation delay of at least one of the related media signals/media paths. Additionally or alternatively, calculating the uncorrected propagation delays and delaying the related media signals may be performed while transporting the related media signals.

Systems include edge input devices and edge output devices to receive and transmit media signals. The edge input devices and the edge output devices are configured to transport the media signals along media paths between the edge input devices and the edge output devices. The media paths have dynamic delay elements to delay the media signals on command. The edge input devices are configured to transmit upstream delay signals (that characterize the propagation delays encountered by the media signals) to the edge output devices. The edge output devices are configured to determine uncorrected propagation delays of the media signals in the media paths. The edge output devices are configured to exchange information relating to the uncorrected propagation delays to settle on a target propagation delay for all media signals (e.g., a maximum of the uncorrected propagation delays) and are configured to command the dynamic delay elements to delay the individual media signals according to the difference between the target propagation delay and the individual media signal uncorrected propagation delay.

DETAILED DESCRIPTION OF INVENTION

Figure 1:
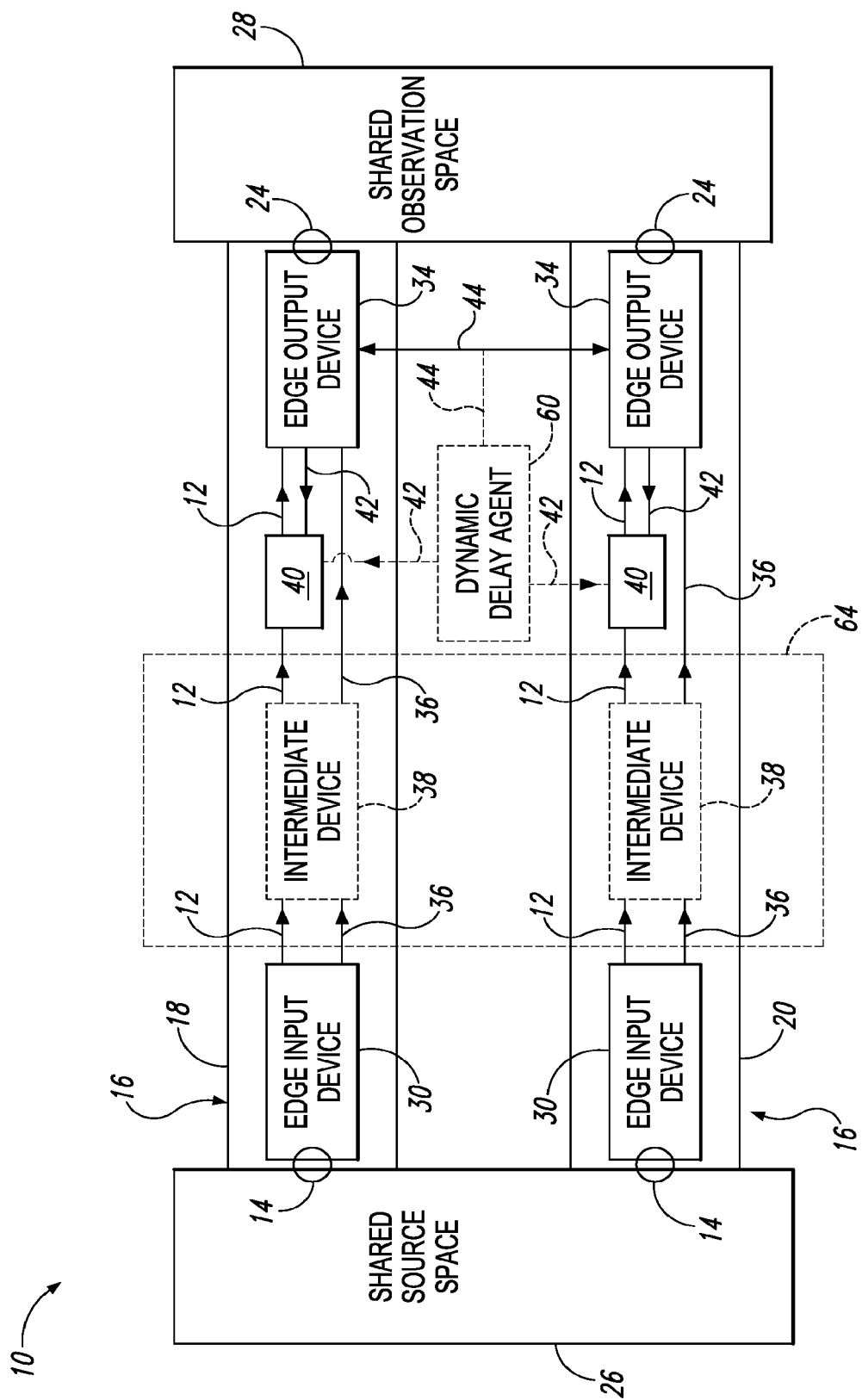
FIG. 1 is a schematic representation of a media transport system of the present disclosure.

For generalized sets of media signals (which each individually may include an audio signal and/or a video signal), lip sync error correction may be referred to as delay equalization, synchronization and/or time alignment. For example, delay equalization may include adding a delay to all but the slowest media signal so that all media signals may be presented substantially aligned in time, without significant synchronization error. Significant error is defined by human perception of the error. Hence, delay equalization may require knowledge or estimation of the difference in the total propagation delay of an audio or video signal and the total propagation delay of a related audio or video signal to an accuracy of better than about 50 ms (.+−.50 ms). In some embodiments, the accuracy is better than 20 ms, better than 10 ms, better than 1 ms, better than 0.1 ms, or better than 0.01 ms. The systems and methods of the present disclosure may be configured to align related audio signals and video signals to better than 50 ms, better than 10 ms, or better than 1 ms. The systems and methods of the present disclosure may be configured to align related audio signals to better than 10 ms, better than 1 ms, better than 0.1 ms, or better than 0.01 ms. Groups of signals, such as all audio signals or stereo audio signals, may be independently aligned and then the group aligned with other groups or other individual signals.

Audio delays may be known or estimable at the time of system configuration and/or system design due to the nature of the audio processing (generally small and similar delays). For example, all the delays of processing and transport may be known, characterized, and/or selected before and/or during system design and/or system configuration. However, some delays, such as due to video processing, variable length audio processing, and network transport, may vary significantly according to the signal source, the type of processing applied, and/or the network architecture. Where the delays of all media signals are known or estimable at the time of configuration and/or design, delay equalization may be called static delay equalization. Where at least some of the delays may vary or change at run time (during the operation of the media transport system rather than during the configuration and/or design of the media transport system), delay equalization may be called dynamic delay equalization.

In dynamic delay equalization systems and methods of the present disclosure, related media signals may be synchronized at run time by tracking the total propagation delay of related media signals at run time and applying an individualized delay to all but the slowest (longest propagation delay) of related media signals. Generally, related media signals include at least one audio signal and at least one video signal. Dynamic delay equalization according to the present disclosure may be referred to as automatic dynamic delay equalization because the systems and methods of the present disclosure provide a mechanism to provide dynamic delay equalization with little to no user intervention needed (e.g., during the operation of the system or method).

As used herein, media signals are signals (generally digital signals) conveying media information. The media information may be audio (possibly including multiple audio channels, e.g., stereo, surround sound, etc.), video, audio and video, and/or associated data (e.g., closed captioning, time codes, etc.). The source of a media signal may be a transducer such as a camera, a microphone, etc. that produces a media signal representative of the physical environment. The source of a media signal may be a receiver and/or a decoder which accepts an electronic input and emits the media signal (e.g., a media server, an audio receiver, a video receiver, an audio-video receiver, and a streaming media device). The media signal may be conveyed using a digital communication protocol and/or interface (e.g., HDMI (High-Definition Multimedia Interface), SDI (Serial Digital Interface), DisplayPort, USB (Universal Serial Bus), FireWire (IEEE 1394), IP (Internet Protocol), UDP (User Datagram Protocol), TCP (Transmission Control Protocol), RTP (Real-time Transport Protocol), AES67 (Audio Engineering Society), AVB (Audio Video Bridging), and AVB/TSN (Audio Video Bridging/Time-Sensitive Networking)), The media signal may be propagated as a media stream or other form of continuous or quasi-continuous data stream. A media stream and a data stream are not necessarily data sourced or transmitted over an Internet, Ethernet, or other network connection.

Media signals are related if they have the same origin and the same destination. Media signals with the same origin originate in the same physical space, same context, and/or same device. For example, media signals delivered as a combined signal from a source such as a media player, video server, satellite receiver, etc. are media signals with the same origin. Media signals generated by microphones and cameras that are observing the same event are media signals with the same origin. Embedded audio with video from a video media player source (DVD, satellite receiver, etc.) are media signals with the same origin. As used herein, the common origin of related media signals is referred to as a shared source space and may be referred to as a shared acquisition space, a unified source space, a shared timing context, and a unified timing context. Media signals with the same destination are rendered in, or affect audio and/or video rendered in, the same physical space, same context, or same device. For example, a video signal displayed on a screen and an audio signal played by loudspeakers have the same destination if the video on the screen and the audio from the loudspeakers are simultaneously observable. Media signals that are combined, transmitted and/or encoded together as an output signal and/or stream (e.g., as embedded audio and video, a multimedia file, etc.) have the same destination. As used herein, the common destination of related media signals is referred to as a shared observation space and may be referred to as a shared rendering space, a unified observation space, a shared rendering context, and a unified rendering context. Hence, related media signals are sourced from a shared source space and are rendered in a shared observation space.

FIGS. 1-4 illustrate systems and methods of dynamic delay equalization for media transport. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labelled with numbers consistent among the figures. Like numbers in each of the figures, and the corresponding elements, may not be discussed in detail herein with reference to each of the figures. Similarly, all elements may not be labelled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of a media transport system 10 that includes at least two distinct media paths 16 to transport at least two distinct media signals 12 from a shared source space 26 to a shared observation space 28. Because the media signals 12 originate in the shared source space 26 and are destined to the shared observation space 28, the media signals 12 may be referred to as related media signals. Each media path 16 includes an edge input device 30 at an ingress 14 to the media path and an edge output device 34 at an egress 24 to the media path. Though the example of FIG. 1 illustrates just two media paths 16 (a first media path 18 and a second media path 20), the media transport system 10 may include a multitude of media paths 16 between the shared source space 26 and the shared observation space 28. The number of media paths 16 may be configurable in hardware and/or in software. The media transport system 10 may permit a user to specify the shared source space 26, the shared observation space 28, which media signals are related, which media paths carry related media signals 12, which edge devices have an ingress in the shared source space 26, and/or which edge devices have an egress in the shared observation space 28.

Ingresses 14 and egresses 24 are physical and/or logical connections to/from the media paths 16 that permit the media signals 12 to enter/exit the media paths 16. Media paths 16 may have multiple ingresses 14 for different media signals 12 to be input to one media path 16. Additionally or alternatively, one ingress 14 may accept multiple media signals 12. Media paths 16 may have multiple egresses 24 for different media signals 12 to be output from one media path 16. Additionally or alternatively, one egress 24 may emit multiple media signals 12. Each edge input device 30 presents at least one ingress 14 to at least one media path 16.

Each edge output device 34 presents at least one egress 24 from at least one media path 16.

The edge input devices 30 are configured to receive the associated media signal 12 from the shared source space 26 through the associated ingress 14. The associated media signal may originate as video and embedded audio in an audio-visual signal, e.g., from a video media file, DVD, video media player, etc. The associated media signal may originate from sensors such as cameras and/or microphones observing the same event. Each individual media signal 12 (audio or video signal) is received by an edge input device 30. A single edge input device 30 may receive more than one media signal 12 and/or more than one type of media signal 12 (e.g., audio signal, video signal, embedded audio and video signal).

The edge output devices 34 are configured to receive the associated media signal 12 from the respective edge input device 30. The associated media signal 12 may be transmitted directly or indirectly between the edge input device 30 and the edge output device 34. For example, the media path 16 may include one or more intermediate devices 38 between the edge input device 30 and the edge output device 34. As another example, the media signal 12 may be transported through a network fabric 64 as discussed further herein.

During transport between the ingress 14 and the egress 24 (e.g., through the edge input device 30, through the edge output device 34, and between the edge devices), the media signal 12 experiences propagation delay. As used herein, propagation delay includes processing and transport delays.

At least one media signal 12 is transported through a different media path 16 than another of the media signals 12. Generally, each media signal 12 passes through a different media path 16 from the ingress(es) 14 to the egress(es) 24, even if more than one media signal 12 passes through the same device or devices along the path from one ingress 14 to one egress 24. Media paths 16 are distinct if there is some difference between the media paths. For example, media paths 16 are distinct if at least one of: the edge input devices 30 are different, the edge output devices 34 are different, one or more intermediate devices 38 are different, or processing within one or more of the devices is different. Generally, the media signals 12 in distinct media paths 16 experience different propagation delays (without including the effects of dynamic delay equalization).

The edge output devices 34 also are configured to receive an upstream delay signal 36 from the upstream device or devices. The upstream delay signal 36 is related to the propagation delay experienced by the media signal 12 as it passes through the edge input device 30, intermediate devices 38, and/or network or other transport. The upstream delay signal 36 may indicate a delay time, a latency, and/or a timestamp. Delay times, latencies, and/or timestamps may be absolute (from beginning to end of the period measured) or relative to a given event, given time, and/or a given media signal. Delay times, latencies, and timestamps each independently may be represented as a time value and/or a number of cycles of a clock.

At least the edge input device 30 within a media path 16 is configured to estimate and/or to determine the propagation delay (processing and transport delays) experienced by the media signal 12 as it passes through the edge input device 30. The edge output device 34 is configured to receive the propagation delay (or a value related to the propagation delay) from the edge input device 30 (directly or via intermediaries such as the network or intermediate devices 38). Additionally or alternatively, intermediate devices 38 may be configured to receive the upstream delay signal 36 from the edge input device 30 or other intermediate devices 38 and to modify the upstream delay signal 36 by adding the subject intermediate device's propagation delay (as estimated or determined) to the propagation delay of the upstream device or devices. Each device which adds a propagation delay to the upstream delay signal 36 also may add an estimate or determination of the propagation delay between the origin of the upstream delay signal and the subject device. Hence, the upstream delay signal 36 communicates an estimate and/or determination of the total propagation delay of the media signal 12 up to the point of transmission from the device that transmits the upstream delay signal.

In the example of FIG. 1, the upstream delay signals 36 are shown as propagating in an independent channel between devices. Any or all of the upstream delay signals 36 may be transmitted in the same medium, in the same channel, and/or in the same port as the media signal 12. Generally, edge input devices 30 and intermediate devices 38 that transmit an upstream delay signal 36 provide an upstream delay signal for each of the media signals 12 that the respective device handles.

The edge output devices 34 also are configured to determine an uncorrected propagation delay from the ingress 14 to the egress 24 based upon the upstream delay signal 36 (which communicates the upstream delay). The uncorrected propagation delay generally does not include dynamic delay (as described further herein) imposed by the media transport system 10 to time align the media signals 12. The uncorrected propagation delay also may be based upon an estimate and/or determination of the propagation delay of the media signal 12 through the edge output device 34 and/or the propagation delay of the media signal to the point of rendering in the shared observation space 28. Hence, the uncorrected propagation delay may incorporate the estimated, known, or otherwise determined propagation delays of the media signal 12 from the ingress 14 to the egress 24 and/or to the final point of presentation of the media signal. Propagation delays after the egress 24 may include transport delays and media processing delays (e.g., video processing delays) for the device that renders the media signal (e.g., a video display).

The media signal 12 may be transported through a network fabric 64 of the media transport system 10. The network fabric 64 may have a fixed or dynamic topology. For example, the network fabric 64 may be a network of direct cables connecting the various devices of the media transport system 10. As another example, the network fabric 64 may include, and/or may be, an AVB network (e.g., an AVB/TSN network), a CobraNet network, and/or an AES67 network.

Each media path 16 includes a dynamic delay element 40 configured to delay the media signal 12 based upon a delay command communicated by a delay signal 42. The dynamic delay element 40 may be a buffer, repeater, etc. The variable delay introduced by the dynamic delay element 40 generally is not reflected in the uncorrected propagation delay determined by the edge output device 34. Static delay, delay not affected by the delay signal 42, may be reflected in the uncorrected propagation delay. Media paths 16 may include multiple dynamic delay elements 40, in which case the total delay applied to each media signal 12 may be distributed among the dynamic delay elements 40 of the media path 16. Dynamic delay elements 40 may be independent programmable delay elements in the media path 16 and/or may be incorporated into the edge input device 30, the edge output device 34, and/or one or more of the intermediate devices 38.

Edge output devices 34 are configured to exchange a delay coordination signal 44 relating to the uncorrected propagation delays determined by each of the edge output devices 34. For example, each edge output device 34 may provide its uncorrected propagation delay to each of the other edge output device 34. Hence, each edge output device 34 may have access to all of the uncorrected propagation delays. Additionally or alternatively, the media transport system 10 may include a dynamic delay agent 60 which may receive the uncorrected propagation delays from each of the edge output devices 34 (via the delay coordination signals 44). The dynamic delay agent 60 is a process and/or device of the media transport system 10. The dynamic delay agent 60 may be implemented as an agent, a broker, a central authority, a daemon, a service, etc.

The dynamic delay agent 60, at least one of the edge output devices 34, and/or each of the edge output devices 34 may calculate the maximum of the uncorrected propagation delays (which may be referred to as the longest propagation delay and the target propagation delay). That is, the edge output devices 34 utilize the delay coordination signal 44 (directly or indirectly via the dynamic delay agent 60) to settle on the longest (target) propagation delay. The dynamic delay agent 60 or one of the edge output devices 34 may establish the longest propagation delay and distribute the value to the remaining edge output devices 34. Additionally or alternatively, each of the edge output devices 34 may calculate the longest propagation delay using the same method (the values may or may not be exchanged or otherwise distributed among the edge output devices 34).

The difference between the longest propagation delay and the uncorrected propagation delay of each media signal 12 may be applied to the respective dynamic delay elements 40 to cause each of the media signals except the longest delayed media signal to be delayed a total delay that matches the longest propagation delay. Where the delay to be applied is less than a threshold (e.g., less than 50 ms, 20 ms, 10 ms, 1 ms, 0.1 ms, or 0.01 ms), the delay may not be communicated to the dynamic delay element 40 and/or the dynamic delay element 40 may not apply the delay. The delay to be applied by each dynamic delay element 40 may be communicated by the dynamic delay agent 60 and/or the edge output devices 34 to the dynamic delay elements (via delay signal 42). Each of the edge output devices 34 may receive the longest propagation delay and/or the difference between the longest propagation delay and the uncorrected propagation delay of that edge output device 34.

If any of the elements of a media path 16 changes propagation delay (e.g., by changing processing, source, and/or transport), the upstream delay signal 36 communicates the revised delay to the downstream elements until received and used by the edge output device 34 of the media path 16. The edge output device 34 may then calculate a revised uncorrected propagation delay that may affect the delays applied to each of the media paths. If the revised uncorrected propagation delay is less than the longest propagation delay, the delay applied (via the dynamic delay element 40) to the media path of the revised uncorrected propagation delay is affected. If the revised uncorrected propagation delay is greater than the longest propagation delay, the delays applied to all media paths 16 may be affected. If the prior value of the uncorrected propagation delay was the longest propagation delay, the delays applied to all media paths 16 may be affected.

Thus, all related media signals 12 may be time aligned (synchronized). The related media signals 12 generally are aligned at the egresses 24 and/or in the shared observation space 28. Media signals 12 additionally may be aligned at one or more processing or transport boundaries within the media transport system 10. However, compensating for the propagation delays of each media signal 12 only once between the shared source space 26 and the shared observation space 28 permits a total latency of the related media signals 12 that is substantially the same as the total propagation delay experienced by the longest delayed media signal (without any dynamic delay applied). Using intermediate points for time alignment may result in additional delays applied to all media signals and hence an increased total latency.

The media transport system 10 may include facility for other media signals and other media paths that are not connected to the shared source space 26 and the shared observation space 28. The media transport system 10 may time align the other media signals independent of or in conjunction with the related media signals 12. Additionally or alternatively, the media transport system 10 may apply static delay equalization (i.e., delays that do not change at run time) to the related media signals 12 and/or to the other media signals. In static delay equalization, the media transport system 10 may estimate, determine, or otherwise identify the delay (static delays) each media signal would need to be time aligned (omitting run-time variable delays). Further, the media transport system 10 may apply the static delays to each affected media signal. For related media signals 12, the static delays may be embedded in dynamic delay elements 40 as a minimum delay.

When integrating a static delay equalization scheme and a dynamic delay equalization scheme, using timestamps to define the static and dynamic delays may be convenient. Additionally or alternatively, static and dynamic delays may be expressed as latencies and/or delay times.

Figure 2:
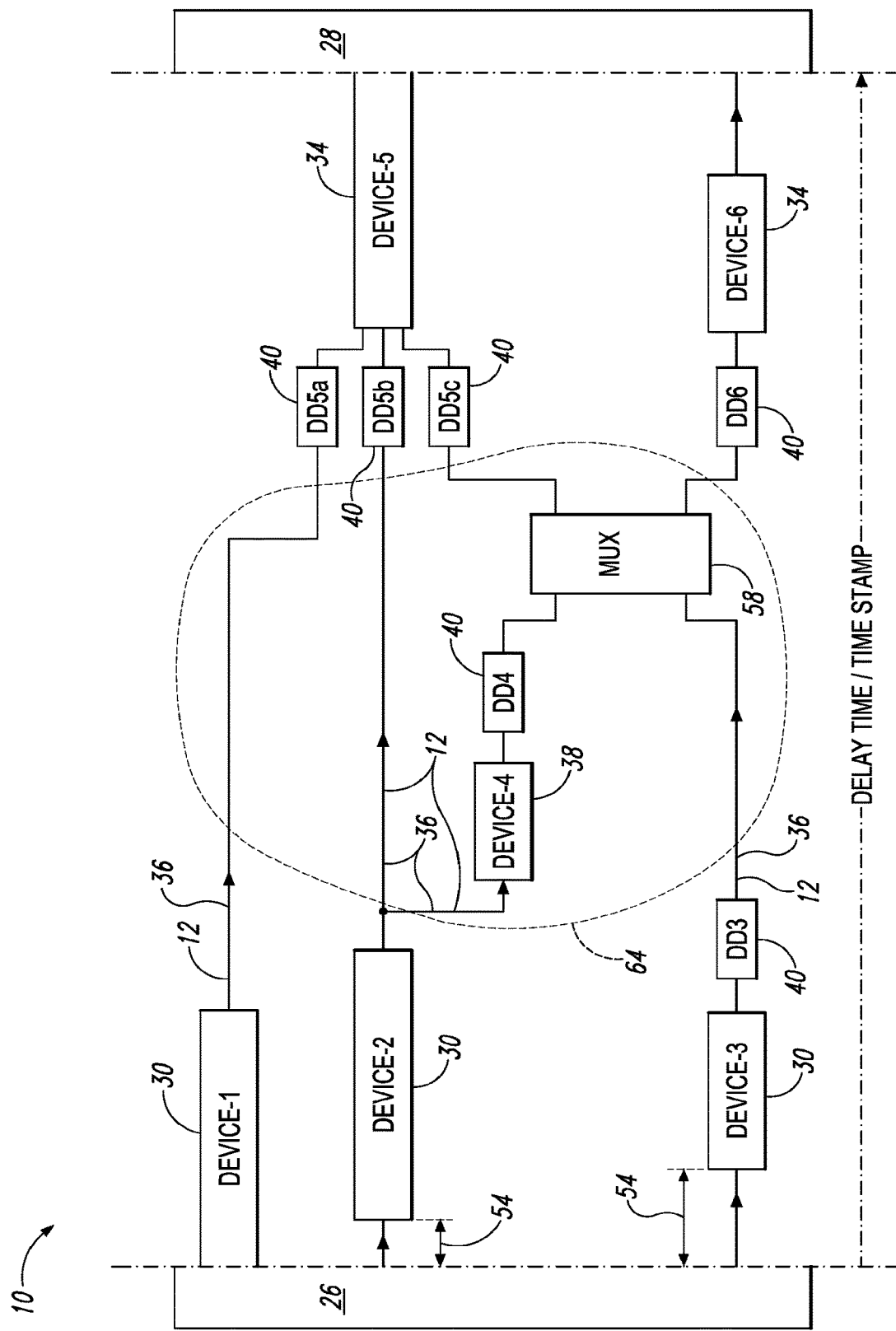
FIG. 2 is a schematic representation of several media paths in a media transport system of the present disclosure.

FIG. 2 illustrates a media transport system 10 with several media paths that each may be affected by static delay equalization and dynamic delay equalization. Media paths between the shared source space 26 and the shared observation space 28 may include the path from Device-1 (an edge input device 30) to Device-5 (an edge output device 34), the direct path from Device-2 (an edge input device 30) to Device-5, the indirect path from Device-2 to Device-5 (through Device-4, an intermediate device 38), the path from Device-2 to Device-6 (an edge output device 34), the path from Device-3 (an edge input device 30) to Device-5, and the path from Device-3 to Device-6. The media paths may pass through a multiplexer 58 (a device which may switch and/or replicate the media signal 12). In FIG. 2, propagation delay and timestamp values generally increase from left to right.

In the example of FIG. 2, upstream delay signals are configured such that the downstream devices (such as Device-4, Device-5, and Device-6) may receive the upstream delay signal 36 from the upstream device or devices in the same media path. Each of the edge input devices 30 and the intermediate devices 38 may provide an upstream delay signal that communicates a timestamp associated with the output of the device. For example, in the media path of Device-1 to Device-5, Device-1 may calculate and provide a timestamp reflecting the propagation delay of the transported media signal. Device-1 may communicate the timestamp to Device-5 through a variety of mechanisms (e.g., direct signal, broadcast, inter-process communication, event-driven communication, etc.). For example, Device-1 may provide the timestamp as a subscribable element and Device-5 may subscribe to the element. When Device-1 changes its timestamp, subscribed devices (such as Device-5) receive the upstream delay signal to report the revised timestamp. Each of Device-2, Device-3, and Device-4 may provide a timestamp in the same manner as described and/or as each other. Each of Device-4, Device-5, and Device-6 may receive a timestamp in the same manner as described and/or as each other.

Each device that receives the timestamp (an incoming timestamp) from one of the downstream devices (i.e., Device-4, Device-5, and Device-6) may determine the timestamp at its output by adding an estimate or determination of the network latency between the devices and adding an estimate or determination of the internal propagation delay of the receiving device to the incoming timestamp. In this manner, each edge output device 34 may determine an independent value for the uncorrected propagation delay of the media signal that is output. Edge input devices 30 and/or intermediate devices 38 may not have any indication of the uncorrected propagation delay of any of the media signals, including the media signal passing through the device. Because the timestamps are propagated downstream, a change in the processing and/or transport (resulting in a change in propagation time) of a media signal by an upstream device may be communicated to downstream devices, which may act on the change by calculating revised uncorrected propagation delays.

In the example of FIG. 2, Device-2 and Device-3 are subject to static delay equalization, as indicated by the source offsets 54 of their inputs relative to the timestamp at the edge of the shared source space 26. For example, Device-3 and Device-6 may be audio only devices with propagation delays that do not vary substantially according to input or type of processing. For devices that have a source offset 54 due to static delays (e.g., Device-2 and Device-3), the source offset may be incorporated in the timestamp of the device and/or the source offset may be communicated to the edge output device 34 at the end of the media path (e.g., Device-5 and/or Device-6).

During configuration, the media transport system 10 may insert dynamic delay elements 40 before each edge output device 34 (for each media signal 12 that is input to the device) such that each media signal encounters at least one dynamic delay element. For example, dynamic delay elements 40 that are directly upstream of edge output devices 34 in the example of FIG. 2 are DD5a, DD5b, DD5c, and DD6. The media transport system 10 may insert dynamic delay elements 40 after one or more upstream devices such as edge input devices 30 and intermediate devices 38. For example, dynamic delay elements 40 that are directly downstream of other devices in the example of FIG. 2 are DD3 and DD4. For media paths that include more than one dynamic delay element 40, the total added delay may be distributed among the dynamic delay elements. Additionally or alternatively, one dynamic delay element 40 may affect the propagation delay of a media signal that may be routed through more than one edge output device 34. For example, the dynamic delay elements DD3 and DD4 may affect the media signals that are routed to Device-5 and/or Device-6 through the multiplexer 58.

Figure 3:
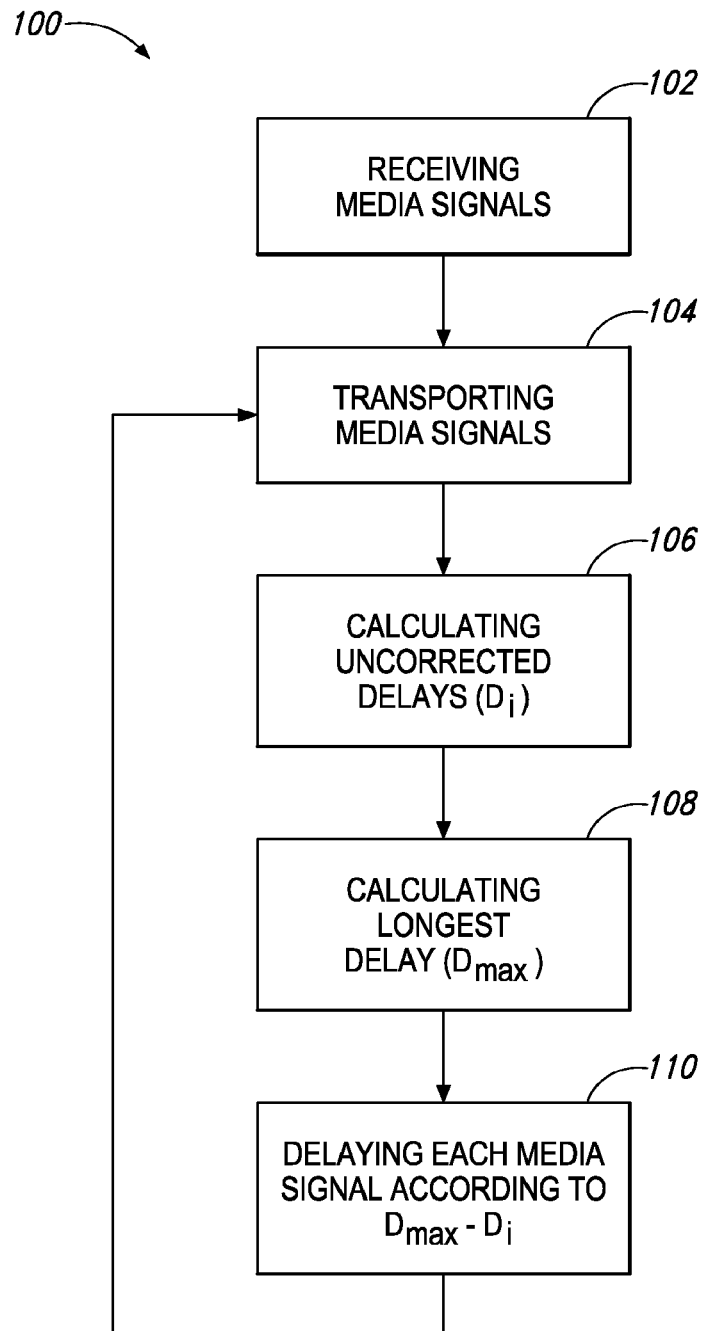
FIG. 3 is a schematic representation of methods for dynamic delay equalization according to the present disclosure.

FIG. 3 schematically represents methods 100 for dynamic delay equalization of media signals (dynamic time alignment) in a media transport system such as media transport system 10. Methods 100 include receiving 102 related media signals, transporting 104 the related media signals, calculating 106 the uncorrected propagation delays ($D_i$), calculating 108 the longest propagation delay ($D_{max}$), and delaying 110 each media signal according to the difference between the longest propagation delay and the respective uncorrected propagation delay ($D_{max}-D_i$). Generally, the calculating 106 the uncorrected propagation delays, calculating 108 the longest propagation delay, and delaying 110 each media signal is performed while transporting 104. Thus, changes in the propagation delays of the individual media signals may be used to maintain the media signals in time alignment during run time of the media transport system.

Receiving 102 includes receiving at least two related media signals and may include receiving a plurality of media signals. The related media signals all have an origin in a shared source space. Receiving 102 may include receiving each of the media signals at a different ingress of edge input devices of the media transport system. The related media signals all have a destination in a shared observation space.

Transporting 104 includes transporting the related media signals along different media paths. That is, at least one media signal is routed along a media path that is different than at least one other media path of the other media signals. Transporting 104 may include transporting each of the media signals to a different egress of edge output devices of the media transport system. Transporting 104 additionally may include transmitting each of the media signals at the respective egresses of the media transport system. Transporting 104 may include transporting the media signals across a network fabric (such as an AVB network) that interconnects ingresses and egresses of the media transport system.

Transporting 104 may induce propagation delays in each of the media signals. Transporting 104 may include transporting the media signals to and/or from processing devices (e.g., edge input device 30, edge output device 34, and intermediate device 38). Additionally or alternatively, transporting 104 may include processing the media signals. The result of transporting 104 and/or processing within the media transport system is that the related media signals experience different propagation delays (before delaying 110). That is, at least one media signal experiences a different propagation delay than at least one other media signal.

Calculating 106 includes calculating the uncorrected propagation delays ($D_i$) of each of the media signals due to the individual media paths taken by each media signal. Calculating 106 may include estimating and/or determining the propagation delay due to each processing and transport element within the respective media path of each media signal.

Calculating 106 may include estimating and/or determining the propagation delay of each media signal within the shared observation space. Edge input devices may calculate a propagation delay of the corresponding media signal due to the effect of the edge input device and/or upstream effects. The edge input devices may communicate the propagation delay to downstream devices. Downstream devices may calculate a propagation delay of the media signal due to the effect of the subject device and/or upstream effects such as the propagation delay communicated by the edge input device and/or propagation delay induced by transport. Each intermediate device may add its propagation delay to the propagation delay communicated by upstream devices and communicate the resultant accumulated delay to downstream devices. Hence, downstream devices may receive an upstream delay signal that includes the propagation delay of upstream devices and/or transport between the devices. The edge output device may calculate the uncorrected propagation delay based on the accumulated upstream propagation delay (and/or the upstream propagation delays of the upstream devices and/or transport between the devices) and an estimate or determination of the edge output device's propagation delay. Each edge output device may independently calculate an uncorrected propagation delay of the media signal handled by that edge output device.

Calculating 108 includes calculating the maximum value of the uncorrected propagation delays ($D_i$). The maximum value is the longest propagation delay ($D_{max}$). Edge output devices may communicate to each other the uncorrected propagation delay of the media signals calculated by the individual edge output devices. Edge output devices may each independently calculate the longest delay independently based on the uncorrected propagation delays of all of the media signals. Additionally or alternatively, the media transport system may include a dynamic delay agent which calculates the longest propagation delay.

Delaying 110 includes delaying each media signal such that all media signals have total propagation delays (including the uncorrected propagation delay and the effects of delaying 110) that are substantially the same (e.g., within human perception). For example, the range of propagation delays of the media signals (the difference from the maximum to the minimum) may be less than 100 ms, less than 40 ms, less than 20 ms, less than 10 ms, less than 2 ms, less than 1 ms, less than 0.2 ms, less than 0.05 ms, less than 0.02 ms, or less than 0.01 ms. Alternatively expressed, creating a particular range of propagation delays of the media signals may be described as time aligning (or synchronizing) the media signal to within the particular range. For mixed audio and video signals, the absolute difference between the average propagation delays of the video signals and the average propagation delays of the audio signals may be less than 100 ms, less than 40 ms, less than 20 ms, less than 10 ms, less than 2 ms, or less than 1ms. Audio and video media signals should be aligned sufficient to avoid the perception of lip sync errors by an observer observing both types of media signals. For audio media signals (e.g., the entire group of media signals or a portion of a mixed group of media signals), the range of propagation delays of the audio signals may be less than 40 ms, less than 20 ms, less than 10 ms, less than 2 ms, less than 1 ms, less than 0.2 ms, less than 0.05 ms, less than 0.02 ms, or less than 0.01 ms. Audio media signals may be aligned sufficient to achieve auditory fusion in an observer observing the audio media signals. Audio media signals may be aligned to within a few digital sampling cycles of the audio media signals (e.g., within 4 cycles, within 2 cycles, or within 1 cycle of 48 kHz sampled audio media signals).

The media signal with the longest propagation delay may not be additionally delayed by delaying 110. The delay applied to each media signal by the delaying 110 may be the difference between the longest delay and the media signal's uncorrected propagation delay ($D_{max} - D_i$). This difference is zero for the media signal with the longest propagation delay. All other media signals are delayed by the delaying 110. Delaying 110 may include delaying each media signal by a uniform amount greater than $D_{max} - D_i$.

Delaying 110 may include inserting dynamic delay elements and/or applying dynamic delay elements within the media paths of all but the longest delayed media path (or all media paths). The dynamic delay elements may be dynamic delay elements 40.

Figure 4:
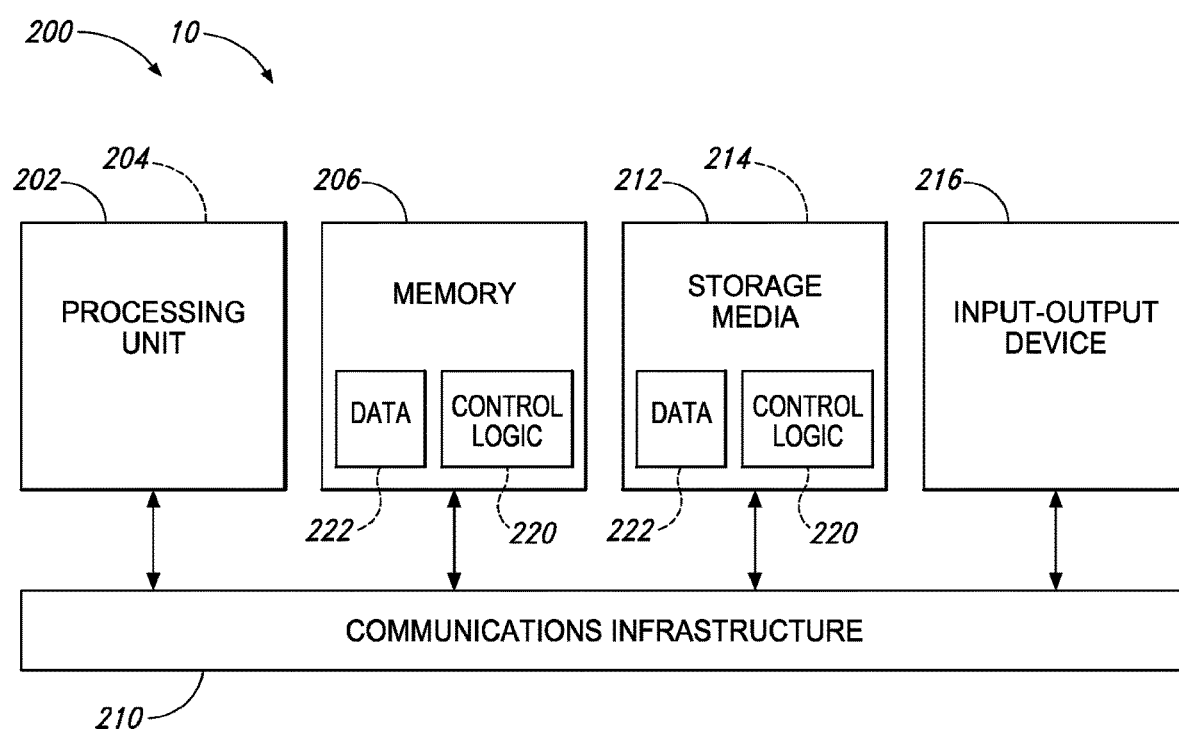
FIG. 4 is a schematic representation of computerized systems according to the present disclosure.

FIG. 4 schematically represents a computerized system 200 that may be used to implement and/or instantiate media transport system 10 and components thereof, such as edge input device 30, edge output device 34, intermediate device 38, and dynamic delay element 40. The computerized system 200 includes a processing unit 202 that may be operatively coupled to a computer-readable memory 206 by a communications infrastructure 210. The processing unit 202 may include one or more computer processors 204 and may include a distributed group of computer processors 204. The processing unit 202 may include, or be implemented on, programmable, reconfigurable, and/or dedicated hardware such as field-programmable gate arrays, digital signal processors, and/or application specific integrated circuits.

The computerized system 200 also may include a computer-readable storage media assemblage 212 that is operatively coupled to the processing unit 202 and/or the computer-readable memory 206, e.g., by communications infrastructure 210. The computer-readable storage media assemblage 212 may include one or more non-transitory computer-readable storage media 214 and may include a distributed group of non-transitory computer-readable storage media 214.

The communications infrastructure 210 may include a local data bus, a communication interface, and/or a network interface. The communications infrastructure 210 may be configured to transmit and/or to receive signals, such as electrical, electromagnetic, optical, and/or acoustic signals. The communication infrastructure 210 may include the ingress 14 and/or the egress 24.

The computerized system 200 may include one or more input-output devices 216 operatively coupled to the processing unit 202, the computer-readable memory 206, and/or the computer-readable storage media assemblage 212. Input-output devices 216 are generally configured for user interaction and may be configured for visual, audio, and/or tactile input and/or output. Each input-output device 216 independently may be configured for only input, only output, primarily input, primarily output, and/or a combination of input and output. Examples of input-output devices 216 include monitors (e.g., video monitor), displays (e.g., alphanumeric displays, lamps, and/or LEDs), keyboards, pointing devices (e.g., mice), touch screens, speakers, and buzzers.

The computerized system 200 may include a distributed group of computers, servers, workstations, etc., which each may be interconnected directly or indirectly (including by network connection). Thus, the computerized system 200 may include one or more processing units 202, computer-readable memories 206, computer-readable storage media assemblages 212, and/or input-output devices 216 that are located remotely from one another.

One or both of the computer-readable memory 206 and the computer-readable storage media assemblage 212 include control logic 220 and/or data 222. Control logic 220 (which may also be referred to as software, firmware, gateware, and/or hardware) may include instructions that, when executed by the processing unit 202, cause the computerized system 200 to perform one or more of the methods described herein. Control logic 220 may include one or more of the dynamic delay element 40 and the dynamic delay agent 60. Data 222 may include the media signals, the propagation delay values, the longest propagation delay, and/or data associated with the methods described herein.

Where devices, elements, and/or methods are described as performing one or more functions, the respective device and/or element is configured, e.g., programmed, to perform the function(s). The respective device and/or element may include one or more programs, agents, services, and/or components configured, e.g., programmed, to perform the function(s) when the programs, agents, services, and/or components are executed by the processing unit 202 or otherwise operated by the computerized system 200. The control logic 220 and/or data 222 may include instructions and/or information corresponding to the programs, agents, services, and/or components.

Examples of inventive subject matter according to the present disclosure are described in the following enumerated paragraphs.

A1. A method for dynamic delay equalization of media signals in a media transport system, the method comprising:

receiving a first media signal at a first ingress of a media transport system and transporting the first media signal along a first media path in the media transport system to a first egress of the media transport system;

receiving a second media signal at a second ingress of the media transport system and transporting the second media signal along a second media path in the media transport system to a second egress of the media transport system, wherein the first media signal and the second media signal are sourced from a shared source space and are destined to a shared observation space;

calculating a first uncorrected propagation delay due to the first media path, calculating a second uncorrected propagation delay due to the second media path, and calculating a shortest propagation delay that is a shorter of the first uncorrected propagation delay and the second uncorrected propagation delay;

delaying one of the first media signal and the second media signal that has the shortest uncorrected propagation delay by an amount related to a difference between the first uncorrected propagation delay and the second uncorrected propagation delay;

in response to changed first media signal propagation parameters while transporting the second media signal, calculating a revised first uncorrected propagation delay and calculating a revised shortest propagation delay that is a shorter of the revised first uncorrected propagation delay and the second uncorrected propagation delay;

delaying one of the first media signal and the second media signal that has the revised shortest uncorrected propagation delay by an amount related to a difference between the revised first uncorrected propagation delay and the second uncorrected propagation delay.

A2. The method of paragraph A1, wherein the receiving the first media signal includes receiving the first media signal with a first edge input device of the media transport system at the first ingress of the media transport system and wherein the receiving the second media signal includes receiving the second media signal with a second edge input device of the media transport system at the second ingress of the media transport system.

A2.1. The method of paragraph A2, wherein the first edge input device induces a first input propagation delay in the first media signal, wherein the calculating the first uncorrected propagation delay due to the first media path includes calculating the first uncorrected propagation delay based on the first input propagation delay, wherein the second edge input device induces a second input propagation delay in the second media signal, and wherein the calculating the second uncorrected propagation delay due to the second media path includes calculating the second uncorrected propagation delay based on the second input propagation delay.

A2.2. The method of any of paragraphs A2-A2.1, wherein the transporting the first media signal includes transporting the first media signal from the first edge input device to a first edge output device of the media transport system at the first egress of the media transport system and wherein the transporting the second media signal includes transporting the second media signal from the second edge input device to a second edge output device of the media transport system at the second egress of the media transport system.

A2.2.1. The method of paragraph A2.2, wherein the first edge output device induces a first output propagation delay in the first media signal, wherein the calculating the first uncorrected propagation delay due to the first media path includes calculating the first uncorrected propagation delay based on the first output propagation delay, wherein the second edge output device induces a second output propagation delay in the second media signal, and wherein the calculating the second uncorrected propagation delay due to the second media path includes calculating the second uncorrected propagation delay based on the second output propagation delay.

A2.2.2. The method of any of paragraphs A2.2-A2.2.1, wherein the first edge input device induces a/the first input propagation delay in the first media signal, wherein the calculating the first uncorrected propagation delay due to the first media path includes receiving a first upstream delay signal relating to the first input propagation delay at the first edge output device, wherein the second edge input device induces a/the second input propagation delay in the second media signal, and wherein the calculating the second uncorrected propagation delay due to the second media path includes receiving a second upstream delay signal relating to the second input propagation delay at the second edge output device.

A2.2.3. The method of any of paragraphs A2.2-A2.2.2, wherein the calculating the shortest propagation delay includes communicating the first uncorrected propagation delay from the first edge output device to the second edge output device, communicating the second uncorrected propagation delay from the second edge output device to the first edge output device, and calculating the shortest propagation delay in the first edge output device and in the second edge output device.

A3. The method of any of paragraphs A1-A2.2.3, wherein transporting the first media signal along the first media path includes transporting the first media signal along the first media path within a network fabric of the media transport system and wherein transporting the second media signal along the second media path includes transporting the second media signal along the second media path within the network fabric, and optionally wherein the network fabric includes an AVB (Audio Video Bridging) network.

A4. The method of any of paragraphs A1-A3, wherein the first media signal is a video signal and the second media signal is one of a video signal and an audio signal.

A5. The method of any of paragraphs A1-A3, wherein the first media signal is an audio signal and the second media signal is an audio signal.

A6. The method of any of paragraphs A1-A5, wherein the first ingress and the second ingress are the same.

A7. The method of any of paragraphs A1-A6, wherein the first egress and the second egress are the same.

A8. The method of any of paragraphs A1-A7, wherein the delaying one of the first media signal and the second media signal that has the shortest uncorrected propagation delay includes creating a relative propagation delay of the first media signal and the second media signal that is less than 100 ms, less than 40 ms, less than 20 ms, less than 10 ms, less than 2 ms, less than 1 ms, less than 0.2 ms, less than 0.05 ms, less than 0.02 ms, or less than 0.01 ms.

A9. The method of any of paragraphs A1-A7, wherein the delaying one of the first media signal and the second media signal that has the revised shortest uncorrected propagation delay includes creating a relative propagation delay of the first media signal and the second media signal that is less than 100 ms, less than 40 ms, less than 20 ms, less than 10 ms, less than 2 ms, less than 1 ms, less than 0.2 ms, less than 0.05 ms, less than 0.02 ms, or less than 0.01 ms.

A10. The use of a media transport system to perform the method of any of paragraphs A1-A9.

A11. A media transport system comprising:
a computer-readable memory;
a processing unit operatively coupled to the computer-readable memory; and
a computer-readable storage media assemblage, wherein the computer-readable storage media assemblage is operatively coupled to the computer-readable memory and includes instructions that, when executed by the processing unit, cause the system to perform the method of any of paragraphs A1-A9.

B1. A method for dynamic delay equalization of related media signals in a media transport system, the method comprising:
(a) receiving a plurality of related media signals by a media transport system, wherein the related media signals are each sourced from a shared source space and are destined to a shared observation space;
(b) transporting the related media signals in the media transport system along different media paths;
(c) calculating an uncorrected propagation delay for each media path and calculating a longest propagation delay that is a maximum of the uncorrected propagation delays;
(d) delaying each of the related media signals by an amount related to a difference between the longest propagation delay and the uncorrected propagation delay of that related media signal;
(e) in response to a change to a propagation delay of at least one of the related media signals while transporting the related media signals, determining a revised uncorrected propagation delay for each media path and determining a revised longest propagation delay that is a maximum of the revised uncorrected propagation delays; and
(f) delaying each of the related media signals by an amount related to a difference between the revised longest propagation delay and the revised uncorrected propagation delay of that related media signal.

B2. The method of paragraph B1, wherein determining the revised uncorrected propagation delay for each media path includes calculating the revised uncorrected propagation delay of the related media signals that experienced the change.

B3. The method of any of paragraphs B1-B2, wherein the plurality of related media signals includes a first media signal and a second media signal, and wherein the method includes the method of any of paragraphs A1-A9.

B4. The method of any of paragraphs B1-B3, wherein each media path includes an edge input device that induces an input propagation delay and an edge output device that induces an output propagation delay, wherein the (c) calculating the uncorrected propagation delay for each media path includes calculating the uncorrected propagation delay based upon the input propagation delay and the output propagation delay.

B4.1. The method of paragraph B4, further comprising communicating, for each media path, the input propagation delay from the edge input device to the edge output device in parallel with the related media signal that is transported along the media path, and optionally wherein the (c) calculating the uncorrected propagation delay for each media path includes calculating the uncorrected propagation delay by the edge output device that receives the related media signal and the input propagation delay.

B4.2. The method of any of paragraphs B4-B4.1, wherein the (a) receiving the plurality of related media signals includes receiving the plurality of related media signals by the edge input devices of the media paths.

B4.3. The method of any of paragraphs B4-B4.2, wherein the (b) transporting the related media signals includes transporting the related media signals between the edge input devices and the edge output devices of the media paths.

B4.4. The method of any of paragraphs B4-B4.3, further comprising communicating an accumulated propagation delay for each related media signal and associated media path to the edge output device of the media path, and optionally wherein the (c) calculating the uncorrected propagation delay for each media path includes calculating, by the edge output device that receives the related media signal and the accumulated propagation delay, the uncorrected propagation delay based on the accumulated propagation delay.

B5. The method of any of paragraphs B1-B4.4, wherein the plurality of related media signals includes at least one video media signal and at least one audio media signal.

B6. The method of any of paragraphs B1-B5, wherein the plurality of related media signals includes at least two audio media signals.

B7. The method of any of paragraphs B1-B6, wherein the (d) delaying includes time aligning all of the related media signals to within 100 ms, within 40 ms, within 20 ms, within 10 ms, within 2 ms, within 1 ms, within 0.2 ms, within 0.05 ms, within 0.02 ms, or within 0.01 ms.

B8. The method of any of paragraphs B1-B7, wherein the (d) delaying includes time aligning all audio media signals of the related media signals to within 40 ms, within 20 ms, within 10 ms, within 2 ms, within 1 ms, within 0.2 ms, within 0.05 ms, within 0.02 ms, or within 0.01 ms.

B9. The method of any of paragraphs B1-B8, wherein the (d) delaying includes time aligning all audio media signals of the related media signals to all video media signals of the related media signals to create a range of propagation delays among the audio media signals relative to the video media signals that is less than 100 ms, less than 40 ms, less than 20 ms, less than 10 ms, less than 2 ms, or less than 1 ms.

B10. The method of any of paragraphs B1-B9, wherein the (f) delaying includes time aligning all of the related media signals to within 100 ms, within 40 ms, within 20 ms, within 10 ms, within 2 ms, within 1 ms, within 0.2 ms, within 0.05 ms, within 0.02 ms, or within 0.01 ms.

B11. The method of any of paragraphs B1-B10, wherein the (f) delaying includes time aligning all audio media signals of the related media signals to within 40 ms, within 20 ms, within 10 ms, within 2 ms, within 1 ms, within 0.2 ms, within 0.05 ms, within 0.02 ms, or within 0.01 ms.

B12. The method of any of paragraphs B1-B11, wherein the (f) delaying includes time aligning all audio media signals of the related media signals to all video media signals of the related media signals to create a range of propagation delays among the audio media signals relative to the video media signals that is less than 100 ms, less than 40 ms, less than 20 ms, less than 10 ms, less than 2 ms, or less than 1 ms.

B13. The use of a media transport system to perform the method of any of paragraphs B1-B12.

B14. A media transport system comprising:
a computer-readable memory;
a processing unit operatively coupled to the computer-readable memory; and a computer-readable storage media assemblage, wherein the computer-readable storage media assemblage is operatively coupled to the computer-readable memory and includes instructions that, when executed by the processing unit, cause the system to perform the method of any of paragraphs B1-B12.

C1. A method for dynamic delay equalization of related media signals in a media transport system, the method comprising:
receiving a plurality of related media signals by a media transport system, wherein the related media signals are each sourced from a shared source space and are destined to a shared observation space;
transporting the related media signals in the media transport system along different media paths; and while transporting the related media signals: calculating an uncorrected propagation delay for each media path and calculating a longest propagation delay that is a maximum of the uncorrected propagation delays; and delaying each of the related media signals by an amount related to a difference between the longest propagation delay and the uncorrected propagation delay of that related media signal.

C2. The method of paragraph C1, wherein a propagation delay of at least one of the related media signals changes during transporting.

C3. The method of any of paragraphs C1-C2, wherein the plurality of related media signals includes a first media signal and a second media signal, and wherein the method includes the method of any of paragraphs A1-A9.

C4. The method of any of paragraphs C1-C3, wherein each media path includes an edge input device that induces an input propagation delay and an edge output device that induces an output propagation delay, wherein the calculating the uncorrected propagation delay for each media path includes calculating the uncorrected propagation delay based upon the input propagation delay and the output propagation delay.

C4.1. The method of paragraph C4, further comprising communicating, for each media path, the input propagation delay from the edge input device to the edge output device in parallel with the related media signal that is transported along the media path, and optionally wherein the calculating the uncorrected propagation delay for each media path includes calculating the uncorrected propagation delay by the edge output device that receives the related media signal and the input propagation delay.

C4.2. The method of any of paragraphs C4-C4.1, wherein the receiving the plurality of related media signals includes receiving the plurality of related media signals by the edge input devices of the media paths.

C4.3. The method of any of paragraphs C4-C4.2, wherein the transporting the related media signals includes transporting the related media signals between the edge input devices and the edge output devices of the media paths.

C4.4. The method of any of paragraphs C4-C4.3, further comprising communicating an accumulated propagation delay for each related media signal and associated media path to the edge output device of the media path, and optionally wherein the calculating the uncorrected propagation delay for each media path includes calculating, by the edge output device that receives the related media signal and the accumulated propagation delay, the uncorrected propagation delay based on the accumulated propagation delay.

C5. The method of any of paragraphs C1-C4.4, wherein the plurality of related media signals includes at least one video media signal and at least one audio media signal.

C6. The method of any of paragraphs C1-C5, wherein the plurality of related media signals includes at least two audio media signals.

C7. The method of any of paragraphs C1-C6, wherein the delaying includes time aligning all of the related media signals to within 100 ms, within 40 ms, within 20 ms, within 10 ms, within 2 ms, within 1 ms, within 0.2 ms, within 0.05 ms, within 0.02 ms, or within 0.01 ms.

C8. The method of any of paragraphs C1-C7, wherein the delaying includes time aligning all audio media signals of the related media signals to within 40 ms, within 20 ms, within 10 ms, within 2 ms, within 1 ms, within 0.2 ms, within 0.05 ms, within 0.02 ms, or within 0.01 ms.

C9. The method of any of paragraphs C1-C8, wherein the delaying includes time aligning all audio media signals of the related media signals to all video media signals of the related media signals to create a range of propagation delays among the audio media signals relative to the video media signals that is less than 100 ms, less than 40 ms, less than 20 ms, less than 10 ms, less than 2 ms, or less than 1 ms.

C10. The use of a media transport system to perform the method of any of paragraphs C1-C9.

C11. A media transport system comprising:
a computer-readable memory;
a processing unit operatively coupled to the computer-readable memory; and
a computer-readable storage media assemblage, wherein the computer-readable storage media assemblage is operatively coupled to the computer-readable memory and includes instructions that, when executed by the processing unit, cause the system to perform the method of any of paragraphs C1-C9.

D1. A media transport system comprising:
a first media path that includes a first edge input device at a first ingress and a first edge output device at a first egress, wherein the first edge input device is configured to receive a first media signal from a shared source space, wherein the first edge output device is configured to receive the first media signal from the first edge input device and to receive a first upstream delay signal from the first edge input device, wherein the first edge output device is configured to transmit the first media signal to a shared observation space, wherein the first edge output device is configured to determine a first uncorrected propagation delay from the first ingress to the first egress based upon the first upstream delay signal, and wherein the first media path includes a first dynamic delay element configured to delay the first media signal based upon a first delay command;
a second media path that includes a second edge input device at a second ingress and a second edge output device at a second egress, wherein the second edge input device is configured to receive a second media signal from the shared source space, wherein the second edge output device is configured to receive the second media signal from the second edge input device and to receive a second upstream delay signal from the second edge input device, wherein the second edge output device is configured to transmit the second media signal to the shared observation space, wherein the second edge output device is configured to determine a second uncorrected propagation delay from the second ingress to the second egress based upon the second upstream delay signal, and wherein the second media path includes a second dynamic delay element configured to delay the second media signal based upon a second delay command;

wherein the first edge output device and the second edge output device are configured to exchange a delay coordination signal relating to the first uncorrected propagation delay and the second uncorrected propagation delay, and are configured to settle on a target propagation delay that is at least as large as a maximum of the first uncorrected propagation delay and the second uncorrected propagation delay;

wherein the first edge output device is configured to command the first dynamic delay element to delay the first media signal an amount of delay related to a difference between the first uncorrected propagation delay and the target propagation delay;

wherein the second edge output device is configured to command the second dynamic delay element to delay the second media signal an amount of delay related to a difference between the second uncorrected propagation delay and the target propagation delay.

D2. The media transport system of paragraph D1, wherein the media transport system includes a network fabric to interconnect the first media path from the first edge input device to the first edge output device and to interconnect the second media path from the second edge input device to the second edge output device, and optionally wherein the network fabric includes an AVB (Audio Video Bridging) network.

D3. The media transport system of any of paragraphs D1-D2, wherein first media signal is a video signal and the second media signal is one of a video signal and an audio signal.

D4. The media transport system of any of paragraphs D1-D2, wherein the first media signal is an audio signal and the second media signal is an audio signal.

D5. The media transport system of any of paragraphs D1-D4, wherein the first edge output device is configured to command the first dynamic delay element to delay the first media signal an amount of delay related to a value by which the second uncorrected propagation delay exceeds the first uncorrected propagation delay.

D6. The media transport system of any of paragraphs D1-D5, wherein the second edge output device is configured to command the second dynamic delay element to delay the second media signal an amount of delay related to a value by which the first uncorrected propagation delay exceeds the second uncorrected propagation delay.

D7. The media transport system of any of paragraphs D1-D6, wherein the first edge output device and the second edge output device are configured to exchange the first uncorrected propagation delay and the second uncorrected propagation delay, and optionally wherein each of the first edge output device and the second edge output device is configured to determine the maximum of the first uncorrected propagation delay and the second uncorrected propagation delay as the target propagation delay.

D8. The media transport system of any of paragraphs D1-D6, wherein the first edge output device is configured to receive the second uncorrected propagation delay from the second edge output device, wherein the first edge output device is configured to determine the maximum of the first uncorrected propagation delay and the second uncorrected propagation delay as the target propagation delay, and wherein the first edge output device is configured to send the target propagation delay to the second edge output device.

D9. The media transport system of any of paragraphs D1-D8, wherein the first edge output device is configured to command the first dynamic delay element to delay the first media signal by a difference between the target propagation delay and the first uncorrected propagation delay.

D10. The media transport system of any of paragraphs D1-D9, wherein the second edge output device is configured to command the second dynamic delay element to delay the second media signal by a difference between the target propagation delay and the second uncorrected propagation delay.

D11. The media transport system of any of paragraphs D1-D10, wherein the media transport system includes a plurality of ingresses and a plurality of egresses, is configured to receive a plurality of related media signals from the shared source space at the plurality of ingresses, and is configured to transmit the plurality of related media signals to the shared observation space from the plurality of egresses;

wherein the plurality of ingresses includes the first ingress and the second ingress, wherein the plurality of egresses includes the first egress and the second egress, and wherein the plurality of related media signals includes the first media signal and the second media signal;

wherein each of the plurality of media signals has an uncorrected propagation delay and wherein the target propagation delay is a maximum of the uncorrected propagation delays of the plurality of related media signals.

D12. The media transport system of any of paragraphs D1-D11, wherein the first edge input device and the second edge input device are configured to transmit the first media signal from the first egress and to transmit the second media signal from the second egress with a relative propagation delay of less than 100 ms, less than 40 ms, less than 20 ms, less than 10 ms, less than 2 ms, less than 1 ms, less than 0.2 ms, less than 0.05 ms, less than 0.02 ms, or less than 0.01 ms by commanding the first dynamic delay element and the second dynamic delay element.

D13. The use of the media transport system of any of paragraphs D1-D12 to dynamically equalize delay between media signals, optionally according to any of the methods of paragraphs A1-A9, B1-B12, or C1-C9.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the singular forms "a", "an" and "the" may be intended to include the plural forms as well, unless the context clearly indicates otherwise.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

INDUSTRIAL APPLICABILITY

The systems and methods disclosed herein are applicable to the communication, entertainment, and video production industries.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method, comprising:
   delaying each related media signal, of a plurality of related media signals, by an amount determined by subtracting an uncorrected propagation delay for each media path from a corresponding maximum propagation delay;
   identifying a revised uncorrected propagation delay for each media path having a longest time period; and
   delaying each related media signal, of the plurality of the related media signals, by an amount determined by reducing the revised uncorrected propagation delay for each media path from a corresponding revised maximum propagation delay.

2. The method of claim 1, wherein each media path includes an edge input device that induces an input propagation delay and an edge output device that induces an output propagation delay.

3. The method of claim 2, further comprising communicating, for each media path, the input propagation delay from the edge input device to the edge output device in parallel with the related media signal that is transported along the media path.

4. The method of claim 2, further comprising communicating an accumulated propagation delay for each related media signal and associated media path to the edge output device of the media path.

5. The method of claim 1, wherein the delaying each include time aligning all of the related media signals to within 20 ms.

6. The method of claim 1, wherein the delaying each include time aligning all audio media signals of the related media signals to within 2 ms.

7. A media transport system, comprising:
   a first media path that includes a first edge input device at a first ingress and a first edge output device at a first egress, wherein the first edge output device is configured to receive a first upstream delay signal from the first edge input device, wherein the first edge output device is configured to determine a first uncorrected propagation delay from the first ingress to the first egress based upon the first upstream delay signal; and
   a second media path that includes a second edge input device at a second ingress and a second edge output device at a second egress, wherein the second edge output device is configured to receive a second upstream delay signal from the second edge input device, wherein the second edge output device is configured to determine a second uncorrected propagation delay from the second ingress to the second egress based upon the second upstream delay signal;
   wherein the first edge output device and the second edge output device are configured to settle on a target propagation delay that is at least as large as a maximum of the first uncorrected propagation delay and the second uncorrected propagation delay.

8. The media transport system of claim 7, wherein the media transport system includes a network fabric to interconnect the first media path from the first edge input device to the first edge output device and to interconnect the second media path from the second edge input device to the second edge output device.

9. The media transport system of claim 7, wherein the first media path includes a first dynamic delay element configured to delay a first media signal from the first edge input device based upon a first delay command, wherein the second media path includes a second dynamic delay element configured to delay a second media signal from the second edge input device based upon a second delay command wherein the first edge output device is configured to command the first dynamic delay element to delay the first media signal by a difference between the target propagation delay and the first uncorrected propagation delay, and wherein the second edge output device is configured to command the second dynamic delay element to delay the second media signal by a difference between the target propagation delay and the second uncorrected propagation delay.

10. The media transport system of claim 9, wherein the first edge output device is configured to command the first dynamic delay element to delay the first media signal an amount of delay related to a value by which the second uncorrected propagation delay exceeds the first uncorrected propagation delay, and wherein the second edge output device is configured to command the second dynamic delay element to delay the second media signal an amount of delay related to a value by which the first uncorrected propagation delay exceeds the second uncorrected propagation delay.

11. The media transport system of claim 9, wherein the media transport system includes a plurality of ingresses and a plurality of egresses;
wherein the plurality of ingresses includes the first ingress and the second ingress, wherein the plurality of egresses includes the first egress and the second egress, and wherein the plurality of media signals includes the first media signal and the second media signal; and
wherein each of the plurality of media signals has an uncorrected propagation delay and wherein the target propagation delay is a maximum of the uncorrected propagation delays of the plurality of media signals.

12. The media transport system of claim 9, wherein the first edge input device and the second edge input device are configured to transmit the first media signal from the first egress and to transmit the second media signal from the second egress with a relative propagation delay of less than 20 ms.

13. The media transport system of claim 7, wherein the first edge output device and the second edge output device are configured to exchange the first uncorrected propagation delay and the second uncorrected propagation delay, and wherein each of the first edge output device and the second edge output device is configured to determine the maximum of the first uncorrected propagation delay and the second uncorrected propagation delay as the target propagation delay.

14. The media transport system of claim 7, wherein the first edge output device is configured to receive the second uncorrected propagation delay from the second edge output device, wherein the first edge output device is configured to determine the maximum of the first uncorrected propagation delay and the second uncorrected propagation delay as the target propagation delay, and wherein the first edge output device is configured to send the target propagation delay to the second edge output device.

15. A non-transitory computer readable medium comprising instructions that when read by a processor, cause the processor to perform:
delaying each related media signal, of a plurality of related media signals, by an amount determined by subtracting an uncorrected propagation delay for each media path from a corresponding maximum propagation delay;
identifying a revised uncorrected propagation delay for each media path having a longest time period; and
delaying each related media signal, of the plurality of the related media signals, by an amount determined by reducing the revised uncorrected propagation delay for each media path from a corresponding revised maximum propagation delay.

16. The non-transitory computer readable medium of claim 15, wherein each media path includes an edge input device that induces an input propagation delay and an edge output device that induces an output propagation delay.

17. The non-transitory computer readable medium of claim 16, wherein the instructions are further configured to perform communicating, for each media path, the input propagation delay from the edge input device to the edge output device in parallel with the related media signal that is transported along the media path.

18. The method of claim 16, wherein the instructions are further configured to perform communicating an accumulated propagation delay for each related media signal and associated media path to the edge output device of the media path.

19. The non-transitory computer readable medium of claim 15, wherein the delaying each include time aligning all of the related media signals to within 20 ms.

20. The non-transitory computer readable medium of claim 15, wherein the delaying each include time aligning all audio media signals of the related media signals to within 2 ms.

* * * * *